(12) United States Patent
Spears

(10) Patent No.: US 7,071,983 B2
(45) Date of Patent: Jul. 4, 2006

(54) SYSTEM AND METHOD FOR CONTROLLING PHOTOSENSITIVE CHARGE TRANSFERS

(75) Inventor: Kurt Eugene Spears, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 706 days.

(21) Appl. No.: 10/177,081

(22) Filed: Jun. 19, 2002

(65) Prior Publication Data

US 2003/0234882 A1    Dec. 25, 2003

(51) Int. Cl.
*H04N 3/14* (2006.01)
*H04N 5/335* (2006.01)

(52) U.S. Cl. ............... 348/312; 348/320; 348/322

(58) Field of Classification Search ............... 358/513, 358/514, 482–483, 474; 382/318; 348/296, 348/298, 297, 312, 319, 262, 311, 320, 294, 348/322

See application file for complete search history.

(56) References Cited

U.S. PATENT DOCUMENTS

| 4,675,744 | A | * | 6/1987 | Mason | 358/461 |
|---|---|---|---|---|---|
| 4,984,088 | A | | 1/1991 | Tani et al. | 358/228 |
| 5,105,264 | A | * | 4/1992 | Erhardt | 348/282 |
| 5,196,939 | A | * | 3/1993 | Elabd et al. | 348/314 |
| 5,303,052 | A | | 4/1994 | Narabu et al. | 348/299 |
| 5,483,282 | A | | 1/1996 | Nakanishi | 348/311 |
| 5,539,460 | A | * | 7/1996 | Tamura | 348/296 |
| 5,757,427 | A | * | 5/1998 | Miyaguchi | 348/243 |
| 5,909,246 | A | * | 6/1999 | Terashima | 348/298 |
| 5,917,546 | A | * | 6/1999 | Fukui | 348/298 |
| 6,476,866 | B1 | * | 11/2002 | Kijima | 348/296 |
| 6,580,456 | B1 | * | 6/2003 | Jacobs | 348/312 |
| 6,714,239 | B1 | * | 3/2004 | Guidash | 348/223.1 |
| 6,728,009 | B1 | * | 4/2004 | Hemmings et al. | 358/474 |
| 6,757,017 | B1 | * | 6/2004 | Lee | 348/297 |
| 6,873,360 | B1 | * | 3/2005 | Kawashiri | 348/296 |
| 2002/0054391 | A1 | * | 5/2002 | Sakai | 358/514 |

FOREIGN PATENT DOCUMENTS

GB            2262383 A         6/1993

* cited by examiner

*Primary Examiner*—Ngoc-Yen Vu
*Assistant Examiner*—Gregory V. Madden

(57) ABSTRACT

A system for controlling photosensitive charge transfers utilizes an array of photosensitive elements, a transfer gate, a charge transfer register, and a controller. The transfer gate is coupled to the photosensitive elements, and the charge transfer register is coupled to the transfer gate. The charge transfer register is configured to receive charges from the array of photosensitive elements, via the transfer gate, and to shift the charges out of the charge transfer register. The controller is configured to control the transfer gate such that charges are collected in each of the photosensitive elements and transferred, via the transfer gate, to the charge transfer register. The controller is further configured to enable the transfer gate during a time period when the charge transfer register is shifting a set of charges previously transferred from the array of photosensitive elements to the charge transfer register.

21 Claims, 9 Drawing Sheets

SYSTEM AND METHOD FOR CONTROLLING PHOTOSENSITIVE CHARGE TRANSFERS

BACKGROUND OF THE INVENTION

1. Field of the Invention

The present invention generally relates to photosensing techniques and, in particular, to a system and method for controlling charge transfers for photosensitive arrays.

2. Related Art

Image scanners convert a visible image on a document or photograph, or an image in a transparent medium, into an electronic form suitable for copying, storing or processing by a computer. An image scanner may be utilized as a part of a camera, a copier, a facsimile machine or other type of device that captures images during operation. In order to capture an image, light is typically reflected off the surface of a document, through an optics system, and onto a photosensitive device.

Each photosensitive device has one or more photosensor arrays, and each photosensor array typically has thousands of individual photosensitive elements. Each photosensitive element, in conjunction with the scanner optics system, measures light intensity from an effective area on the document thereby defining a picture element (pixel) on the image being scanned.

In measuring light intensity from an effective area on the document being scanned, each photosensitive element within a photosensor array collects charge based on the intensity of light received by the photosensitive element. After collecting charge for a specified time period, referred to as an "exposure period," the charges within the photosensitive elements are transferred into a charge transfer register. Usually, charges from different photosensitive elements are transferred into different cells of the charge transfer register such that all of the charge in any cell defines the measured light intensity for the same pixel or, in other words, are transferred from the same photosensitive element.

Once the charges are transferred into the charge transfer register, the photosensitive elements begin collecting charge for the next exposure period. Usually, the charges in the cells of the charge transfer register are serially shifted out of the charge transfer register "bucket-brigade" style. Each set of charges shifted out of the charge transfer register may be converted into an electrical signal, which is later used to define a color value for the corresponding pixel of the image being captured.

Due to various synchronization and data reliability constraints, situations arise when it is desirable for a sample of a photosensor array to be based on an exposure period having a length of time different than the selectable lengths. In such a situation, the exposure period having a time length closest to the desired time length is selected. However, a slight difference may exist between the selected time length and the desired time length.

Some photosensor arrays address the foregoing problems by employing a shutter that effectively enables a photosensor array to take a sample of any desired exposure time length. However, the shutter adds a relatively significant amount of structure to the photosensor array, thereby significantly increasing the size and/or cost of the photosensor array.

SUMMARY OF THE INVENTION

Generally, the present invention provides a photosensitive system and method for controlling charge transfers for photosensitive arrays.

An exemplary embodiment of a photosensitive system in accordance with the present invention utilizes an array of photosensitive elements, a transfer gate, a charge transfer register, and a controller. The transfer gate is coupled to the photosensitive elements, and the charge transfer register is coupled to the transfer gate. The charge transfer register is configured to receive charges from the array of photosensitive elements, via the transfer gate, and to shift the charges out of the charge transfer register. The controller is configured to control the transfer gate such that charges are collected in each of the photosensitive elements and transferred, via the transfer gate, to the charge transfer register. The controller is further configured to enable the transfer gate during a time period when the charge transfer register is shifting a set of charges previously transferred from the array of photosensitive elements to the charge transfer register.

The present invention can also be viewed as providing a method for controlling charge transfers for photosensitive arrays. The method can be broadly conceptualized by the following steps: collecting a first set of charges within an array of photosensitive elements and transferring the first set of charges to a charge transfer register, transferring a second set of charges from the photosensitive elements to the charge transfer register, shifting the first set of charges out of the charge transfer register, shifting the second set of charges out of the charge transfer register, preventing charges collected in the photosensitive elements from transferring to the charge transfer register while the first set of charges remains in the charge transfer register, and enabling charges to transfer from the photosensitive elements to the charge transfer register during the shifting the second set of charges step.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION

Figure 1:
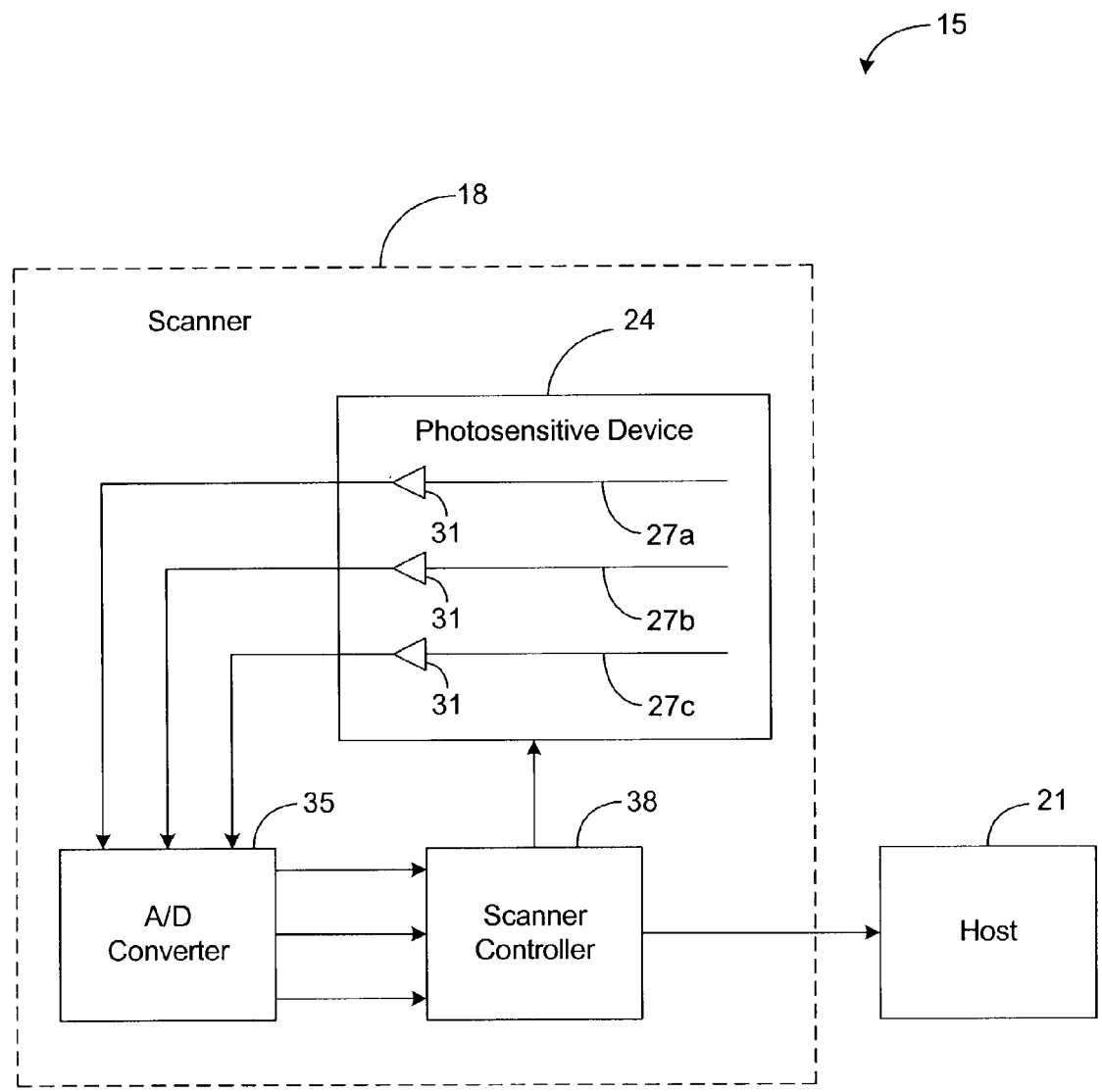
FIG. 1 is a block diagram illustrating a conventional scanning system.

FIG. 1 depicts a conventional scanning system 15. The system 15 includes a scanner 18 that scans a surface of an object (e.g., document, photograph, transparent medium, etc.) in order to produce digital data that may be utilized to reproduce an image of the scanned surface. Often, the digital data is transmitted to a host 21, such as a computer, for example, that can further process the digital data and/or render the digital data.

The scanner 18 typically includes a photosensitive device 24, such as a charge-coupled device (CCD), for example. The photosensitive device 24 may include a plurality of photosensor arrays 27a–27c, as shown by FIG. 1. Each of the photosensor arrays 27a–27c of FIG. 1 measures light intensity from a scanline of the object being scanned. Typically, the light received by each of the photosensor arrays 27a–27c is filtered such that each photosensor array 27a–27b receives light in a different frequency range. For example, it is common to define pixel colors in terms of a plurality of different colors (e.g., red, green, and blue). Thus, the light received by the photosensor arrays 27a–27c may be filtered such that each of the photosensor arrays 27a–27c only receives a different one of the foregoing colors of light.

As will be described in more detail hereafter, each of the photosensor arrays 27a–27c collects charges based on the intensity of light received by the photosensor array 27a–27c. The charges collected during an exposure period are then converted to electrical signals, which are amplified by an output amplifier 31. The output amplifier 31 transmits the electrical signals to an analog-to-digital (A/D) converter 35, which interfaces the electrical signals with a scanner controller 38 after converting the electrical signals into digital signals. The controller 38 may include memory for storing the digital data received from the A/D converter 35 and may include circuitry for processing the digital data in a desired manner. If desired, the controller 38 may transmit the digital data to the host 21, which may render an image based on the digital data received from the scanner 18.

Figure 2:
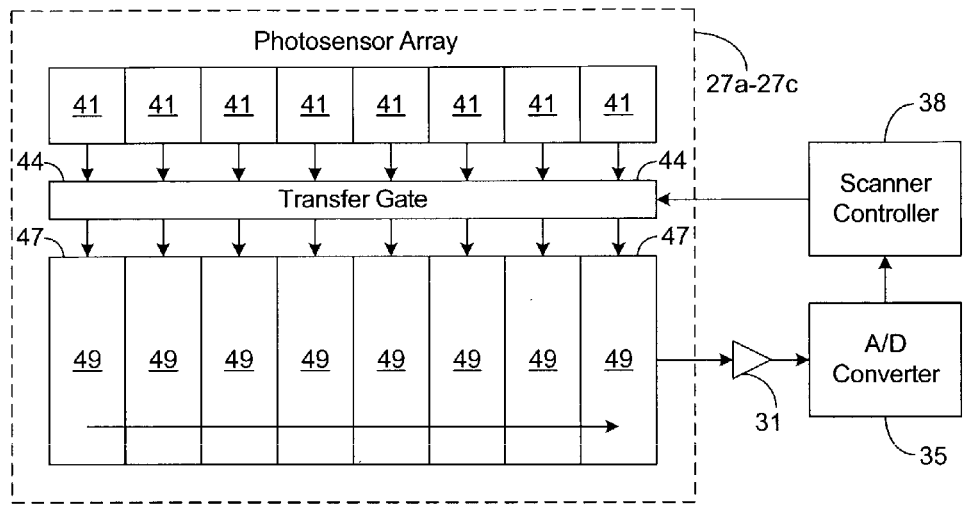
FIG. 2 is a block diagram illustrating a more detailed view of a photosensor array depicted in FIG. 1.

FIG. 2 depicts a more detailed view of one of the photosensor arrays 27a–27c. The array 27a–27c shown by FIG. 2 includes a plurality of photosensitive elements 41. Each photosensitive element 41 collects charge for a different pixel based on the intensity of light received by the photosensitive element 41.

A transfer gate 44, operating under the direction and control of the controller 38, controls the transfer of charges from the photosensitive elements 41 to a charge transfer register 47, which includes a plurality of cells 49 for storing the charges received from the photosensitive elements 41. Generally, during an exposure period, the controller 38 disables the transfer gate 44. As used herein, a "disabled" transfer gate 44 prevents charges from transferring from the photosensitive elements 41 to the register 47, and an "enabled" transfer gate 44 allows charges to transfer from the photosensitive elements 41 through the transfer gate 44 to the register 47.

Therefore, during an exposure period, none of the charges within the elements 41 transfer into the register 47, and charges accumulate in the photosensitive elements 41. At the end of the exposure period, the controller 38 enables the transfer gate 44, usually for a short time, such as one clock cycle, allowing the charges in the photosensitive elements 41 to transfer into the register 47. Once the charges are shifted into the register 47, the controller 38 disables the transfer gate 44 thereby beginning the next exposure period.

During the charge transfer, each cell 49 receives charge from only one element 41. Moreover, during the operation of the scanner 18, all of the charges in any single cell 49 at any given time define the same pixel or, in other words, were collected by the same photosensitive element 41.

After the transfer gate 44 is disabled, beginning the next exposure period, the register 47 begins to serially shift the charges out of the register 47 "bucket-brigade" style. In this regard, for each shift, each set of charges in a respective register cell 49 is transferred to its adjacent cell 49 in a direction toward the output amplifier 31, and the set of charges in the end cell 49 coupled to the output amplifier 31 is shifted out of the register 47. The set of charges shifted out of the register 47 during the shift is converted to an electrical signal, which is amplified by the amplifier 31. Generally, for each shift, the electrical signal output by the amplifier 31 represents the intensity value of the pixel associated with the set of charges output from the register 47. After completing an "n" number of shifts, where "n" represents the total number of cells 49, no more charge should remain within the register 47, provided that the transfer gate 44 remained disabled during each of the shifts.

After all sets of the charges are shifted out of the register 47, the transfer gate 44 is again enabled allowing the charge collected in the elements 41 during the aforementioned register shifting to be transferred into the register 47. The process of collecting charge, transferring the collected charge into the register 47, and shifting the transferred charge out of the register 47 is continually repeated during the scanning of the object.

In some situations, it may be desirable to change the exposure periods depending on the type of object being scanned. As an example, it is well-known that, when scanning a photograph negative, it is typically desirable to have longer exposure times for blue light samples. In such situations, it is also typically desirable for the exposure times for green light samples to exceed the exposure times for red light samples.

Figure 3:
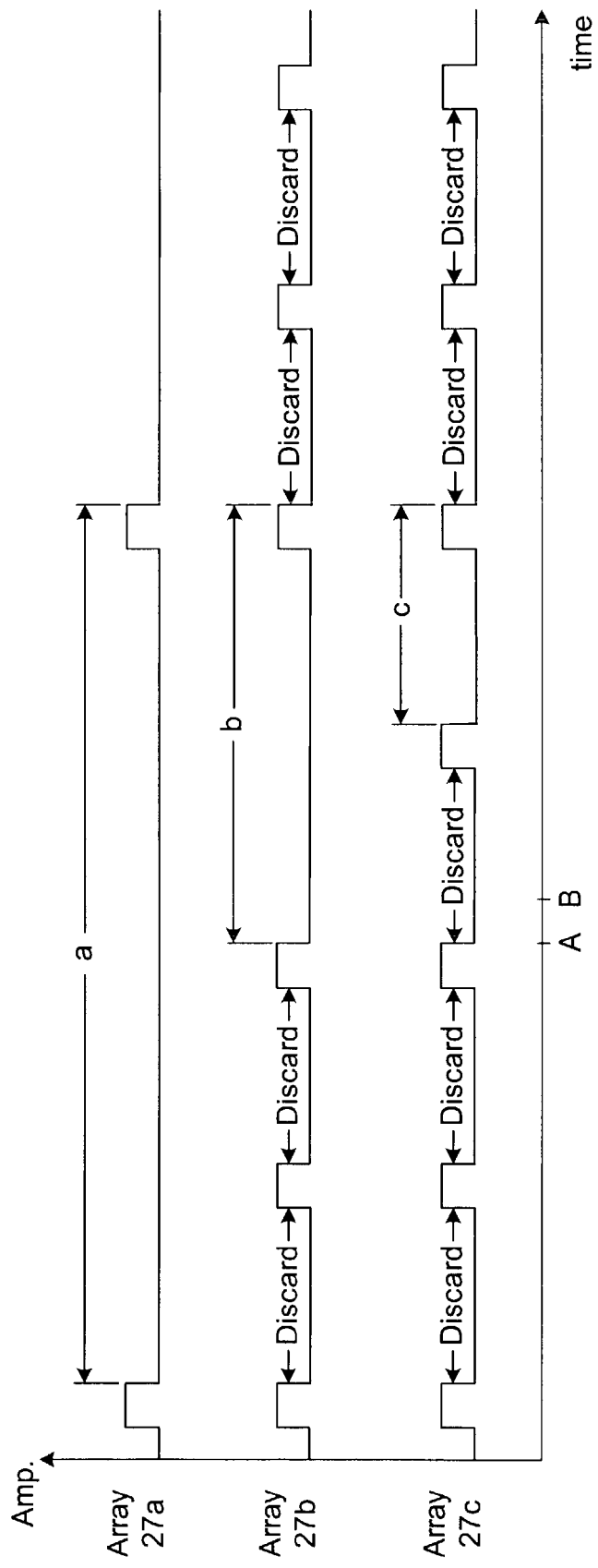
FIG. 3 is a timing diagram illustrating control signals provided by a scanner controller depicted in FIG. 2.

FIG. 3 depicts a timing diagram for the control signals applied to each of the photosensor arrays 27a–27c by the controller 38 when the arrays 27a–27c are utilized to scan blue, green, and red light, respectively, of a photograph negative. In this example, the transfer gates 44 of the arrays 27a–27c are enabled in response to a logical "high" control signal from the controller 38 and disabled in response to a logical "low" control signal from the controller 38. Note that an "exposure period" generally refers to the amount of time between two successive transitions of a transfer gate 44 from an enabled state to a disabled state. Thus, in FIG. 3, an exposure period coincides with the time between two successive transitions to a logical "low."

Note that the charges collected by the photosensor array 27a during exposure period "a" are utilized to define a blue light sample. In this regard, the charges collected during exposure period "a" are transferred into the register 47 of the array 27a and then are shifted out of the register 47 during the next exposure period. Each cell of charges shifted out of the register 47 is converted to an electrical value, which is utilized to define a blue light sample for the pixel that corresponds to the photosensitive element 41 from which the cell of charges was collected.

Furthermore, the charges collected by the photosensor array 27b during exposure period "b" are utilized to define a green light sample. In this regard, the charges collected during exposure time period "b" are transferred into the register 47 of the array 27b and then are shifted out of the register 47 during the next "discard" time period. Each cell of charges shifted out of the register 47 is converted to an electrical value, which is utilized to define a green light sample for the pixel that corresponds to the photosensitive element 41 from which the cell of charges was collected.

In addition, the charges collected by the photosensor array 27c during exposure period "c" are utilized to define a red light sample. In this regard, the charges collected during exposure time period "c" are transferred into the register 47 of the array 27c and then are shifted out of the register 47 during the next "discard" time period. Each cell of charges shifted out of the register 47 is converted to an electrical value, which is utilized to define a red light sample for the pixel that corresponds to the photosensitive element 41 from which the cell of charges was collected.

Thus, for each sample defined by the photosensor arrays 27a–27c, an exposure period "a" for the blue color value is longer than an exposure period "b" for the green color value. Furthermore, the exposure period "b" for the green color value is longer than an exposure period for the red color value "c."

Charges collected during "discard" exposure periods are discarded and, therefore, do not affect the samples taken by any of the photosensor arrays 27a–27c. In this regard, the charges collected during a discard exposure period are transferred into the register 47 and then shifted out of the register 47 during the next exposure period. These charges are then discarded. Note that there are a variety of methodologies that may be employed to discard a cell of charges. For example, a cell of charges to be discarded may be shifted out of the register 47 and converted to an electrical value which is discarded by the controller 38. In another example, the controller 38 may control (e.g., reset) an output amplifier 31 as it is receiving a cell of charges to be discarded such that the amplifier 31 fails to generate an electrical value that is based on the cell of charges to be discarded. Various other techniques may be employed to discard the cells of charges collected during discard exposure periods.

Note that exposure periods for collecting charges actually utilized to define a color value sample, such as exposure periods "a," "b," and "c," for example, are referred to herein as "sample exposure periods." Unlike the values derived from charges collected during discard exposure periods, the values derived from charges collected during sample exposure periods are not discarded. Furthermore, the lengths of exposure periods "a," "b," and "c" may vary from the different drawings herein.

In addition, the length of the discard periods for an array 27a–27c is typically selected to equal or exceed the amount of time utilized to shift a set of charges through each cell 49 of the array's register 47. Therefore, upon completion of a discard period, no charge should remain in the register 47. If the length of the discard period is less than the amount of time utilized to shift a set of charges through each cell 49, then charge from the discard period may remain in the register 47 when the next exposure period occurs. In such a situation, the data derived from the charges collected in the next exposure period may be corrupted since charges from the previous discard period may be mixed with the charges.

Furthermore, to ensure synchronization between the arrays 27a–27c and, more specifically, to ensure that one sample exposure period for any one of the arrays 27a–27c occurs for each sample exposure period of any of the other arrays 27a–27c, the lengths of the sample exposure periods are normally selected such that each longer sample exposure period is an integer multiple of the shorter sample exposure period. As an example, in FIG. 3, the length of the sample exposure period "a" is twice as long as the length of the sample exposure period "b" and four times as long as the sample exposure period "c." Furthermore, the length of the sample exposure period "b" is twice as long as the sample exposure period "c."

With the aforementioned constraints typically placed on the timing of the impulses shown by FIG. 3, it is not always possible for a desired length of a particular sample exposure period to be achieved. Moreover, in some instances, it may be desirable for a shorter sample exposure period to be a magnitude different than an integer multiple of a longer sample exposure period. For example, it may be desirable to change the sample exposure period "b" such that the longer sample exposure period "a" is 2.2 times greater than the sample exposure period "b."

Such an exposure period "b" could be achieved, without violating the aforementioned timing constraints, if the charges collected during a first portion of the sample exposure period "b" for array 27b could be separated from the charges collected during the remaining portion of the exposure period "b." However, the photosensor arrays 27a–27c shown by FIG. 2 include no such mechanism for separating the charges collected during a particular exposure period "a," "b," or "c." Therefore, users of the photosensor arrays 27a–27c usually accept the fact that the arrays 27a–27c will only be able to adjust the sample exposure periods such that the shorter sample exposure periods are integer multiples of the longer exposure periods.

In some situations, it may be desirable to scan only a portion of an object. As the scanner 15 moves across the surface of the object, the signals received from the A/D converter 35 can be discarded by the controller 38 until the scanner 15 reaches the object portion that is to be scanned. Once this occurs, the controller 38 begins to retain and/or process the digital data received from the A/D converter 35. However, if the scanner 15 reaches the foregoing document portion in the middle of a sample exposure period "a," "b," or "c," then it is usually desirable to pause the movement of the scanner 15 and allow the current sample exposure period to expire. After the current sample exposure period expires, the scanner 18 may begin scanning.

Moreover, if such a pause does not occur, then the first sample captured by the scanner 18 may be corrupted. In this regard, charges collected prior to arriving at the portion to be scanned may corrupt charges collected after reaching the foregoing portion. By pausing the scanner 18, charges collected prior to arriving at the portion to be scanned can be emptied from the photosensitive elements 41 and the registers 47 before the first sample occurs, thereby ensuring that the first sample is not corrupted. However, pausing the motion of the scanner 18 when the scanner 18 reaches the portion to be scanned disrupts the motion of the scanner 18, and it would be desirable if the scanner 18 could begin to scan "on the fly" or, in other words, without pausing.

Figure 4:
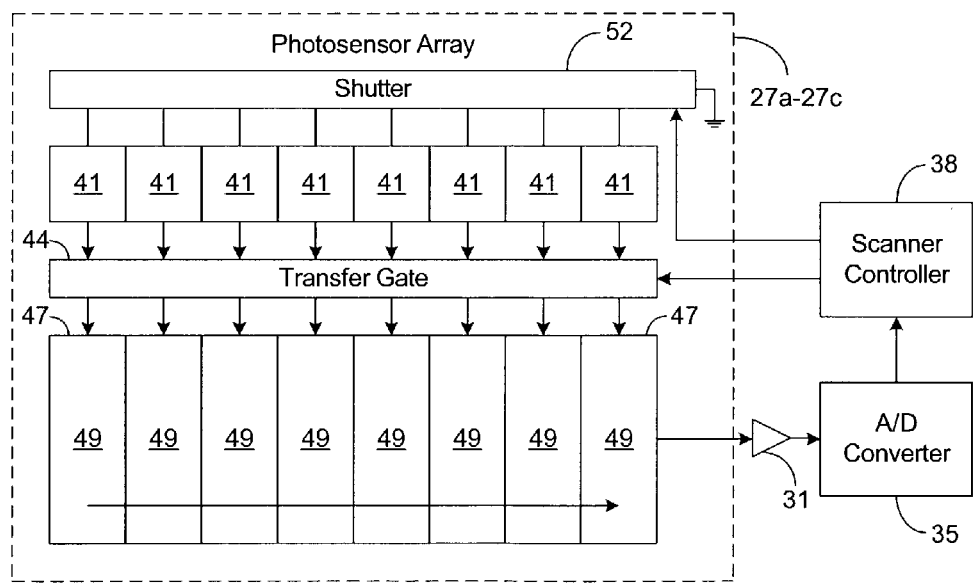
FIG. 4 is a block diagram illustrating another embodiment for the photosensor array depicted in FIG. 2.

To alleviate some of the problems described above, an electronic shutter 52 has been added to some conventional scanners 18, as shown by FIG. 4. When enabled, the electronic shutter 52 conductively couples each photosensitive element 41 to ground, and when disabled, the shutter 52 conductively isolates each photosensitive element 41 from ground. Therefore, when the electronic shutter 52 is enabled, any charge within the photosensitive elements 41 flows out of the elements 41 to ground. However, when the electronic shutter 52 is disabled, any charge collected in the photosensitive elements 41 remains in the photosensitive elements 41, assuming that the transfer gate 44 is also disabled. Consequently, the shutter 52 may be utilized to separate charge collected during one portion of an exposure period from charge collected during another portion of the same exposure period.

As an example, assume that it is desirable for the sample exposure period "a" for array 27a to be 2.2 times the length of exposure period "b" for a sample of array 27b. The foregoing can be achieved by enabling the shutter 52 for a portion (e.g., between points A and B of FIG. 3) of the sample exposure period "b." When the shutter 52 is enabled, the charge collected in the photosensitive elements 41 of array 27b are grounded. Therefore, the sample for array 27b is based on charges collected between point B and the end of the sample exposure "b." The duration that the shutter 52 is enabled from point A to point B is selected such that the length of sample exposure period "a" is 2.2 times the length from point B to the end of the sample exposure period "b." As a result, the desired exposure length for the sample of array 27b is achieved. Note that, in the foregoing example, utilization of the shutter 52 effectively separates the charges collected between points A and B by array 27b from the charges collected by array 27b during the remainder of the sample exposure period "b."

The shutter 52 also may be utilized to enable the scanner 18 to begin scanning "on the fly." In this regard, the controller 38 may enable the shutter 52 until the scanner 18 arrives at the point where scanning should commence. Upon arriving at such a point, referred to hereafter as "the scanning commencement point," the controller 38 disables the shutter 52. Therefore, if the scanner 18 arrives at the scanning commencement point in the middle of sample exposure period "a," "b," or "c," it is not necessary for the scanner's movement to pause. In this regard, any charges collected prior to arriving at the scanning commencement point are grounded. Therefore, only charges collected after the scanner 18 arrives at the scanning commencement point are allowed to transfer out of the photosensitive elements 41 and into the register 47.

Unfortunately, the inclusion of the shutter 52 can significantly increase the size of the photosensitive device 24 and the cost of manufacturing the photosensitive device 24. Therefore, it would be desirable to achieve results similar to those enabled by the shutter 52 without actually implementing the shutter 52 within the device 24.

The present invention generally pertains to a system and method for controlling charge transfers for photosensor arrays. A system in accordance with a preferred embodiment of the present invention enables the realization of benefits similar to the ones enabled by the aforedescribed shutter 52. However, to achieve such benefits in the preferred embodiment, it is not necessary to employ such a shutter 52, thereby helping to reduce the size and/or cost of the scanning system of the preferred embodiment. Indeed, in the preferred embodiment, the foregoing benefits can be achieved without significantly adding additional structure to conventional CCD designs.

Figure 5:
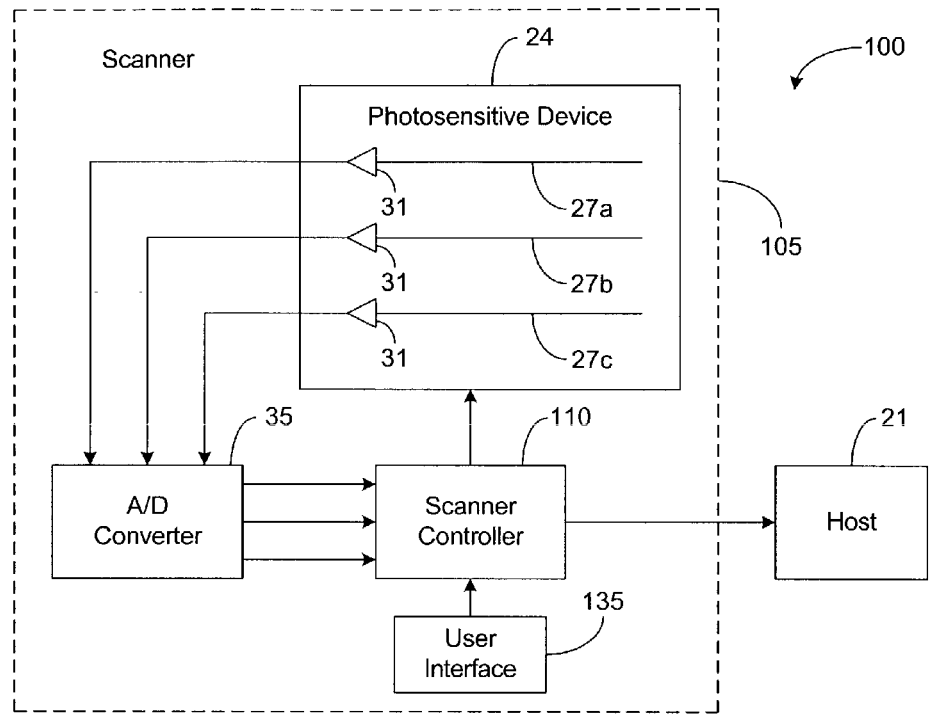
FIG. 5 is a block diagram illustrating a scanning system in accordance with an exemplary embodiment of the present invention.

FIG. 5 depicts a scanning system 100 in accordance with the preferred embodiment of the present invention. As can be seen by comparing FIG. 5 to FIG. 1, the design of the scanning system 100 may be identical to the design of conventional scanning system 15 except that a scanner 105 of the system 100 is controlled by a scanner controller 110 in accordance with the preferred embodiment, which will be described in more detail hereafter.

Figure 6:
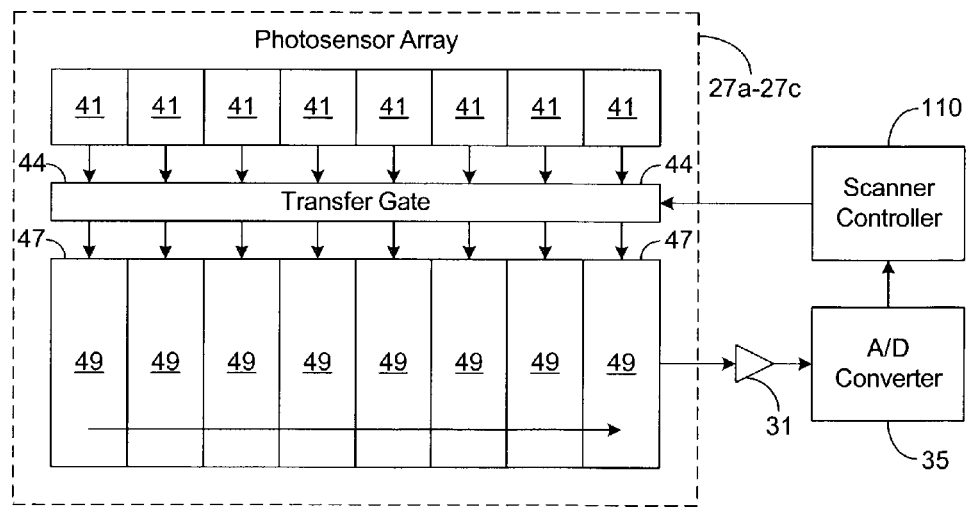
FIG. 6 is a block diagram illustrating a more detailed view of a photosensor array depicted in FIG. 5.

Referring to FIG. 6, the controller 110 preferably controls the transfer gates 44 of the photosensor arrays 27a–27c such that sample exposure periods of any desired length are obtainable. The foregoing can be generally achieved by: (1) enabling the transfer gate 44 during time periods outside of sample exposure periods and data out periods and discarding data derived from charges collected during such outside time periods; (2) disabling the transfer gate 44 during the data out periods; and (3) retaining and/or further processing data derived from the charges collected during the sample exposure periods. Note that a "data out period" for a photosensor array 27a–27b refers to a time period when charges collected during a previous sample exposure period are being shifted out of the array's register 47. Moreover, in a preferred embodiment, the transfer gates 44 can be controlled such that the length of a sample exposure period for an array 27a–27c can precisely coincide with any desired sample exposure length.

Figure 7:
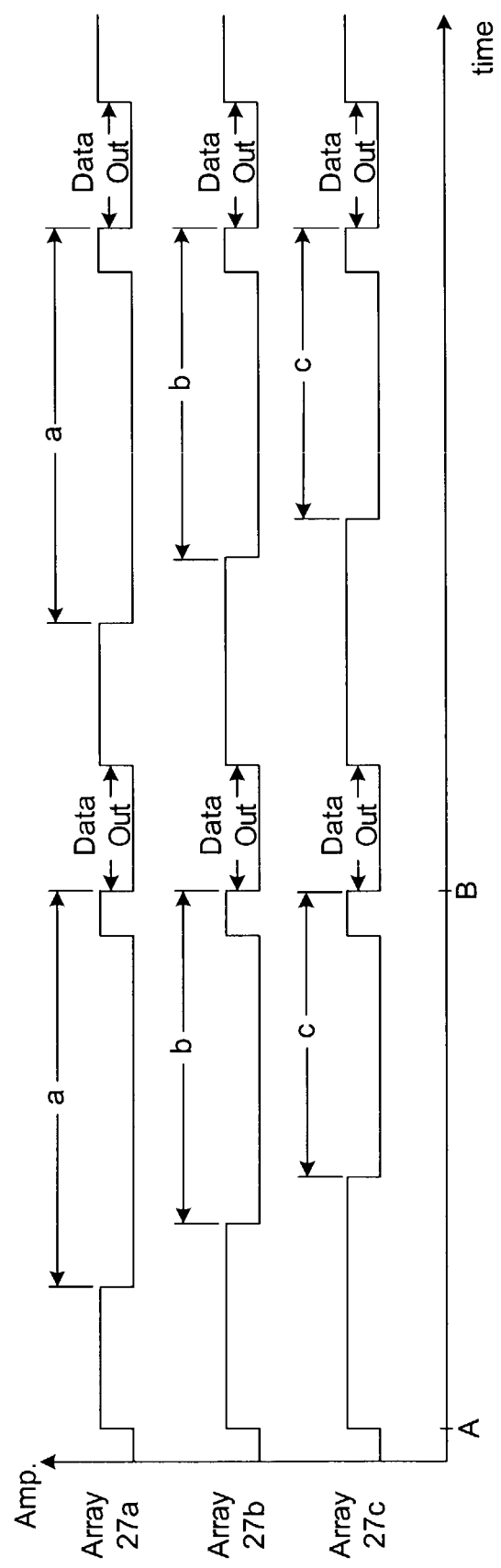
FIG. 7 is a timing diagram illustrating exemplary control signals provided by a scanner controller depicted in FIG. 5.

As an example, assume that it is desirable for the photosensor arrays 27a–27b to have sample exposure periods "a," "b," and "c" seconds, respectively, where the lengths of exposure periods "a," "b," and "c" are not necessarily integer multiples of each other. A suitable timing diagram for the control signal applied to each of the photosensor arrays 27a–27c by the controller 110 is shown in FIG. 7. In the example shown by FIG. 7, assume that the transfer gates 44 of the arrays 27a–27b are enabled in response to a logical "high" control signal from the controller 110 and disabled in response to a logical "low" control signal from controller 110.

As shown by FIG. 7, the sample exposure period "a" of photosensor array 27a is longer than the sample exposure period "b" of photosensor array 27b, and the sample exposure period "b" of photosensor array 27b is longer than the sample exposure period "c" of photosensor array 27c. Such an example may be desirable when photosensor arrays 27a–27c are designed to detect blue, green, and red light, respectively, while scanning a transparent medium, such as a photograph negative.

In the foregoing example, each of the registers 47 in the arrays 27a–27c has the same data out time periods, in terms of both period length and phase. It should be noted that it is not necessary, in other embodiments, for each of the registers 47 in the arrays 27a–27c to have the same data out time periods. However, in the preferred embodiment, the arrays 27a–27c take the same number of samples over time (i.e., the arrays 27a–27c have the same sampling rate). Thus, the data out time periods, which immediately follow sample exposure periods, preferably occur at the same frequency.

Referring to FIG. 7, assume that point A represents a time when each of the registers 47 in the arrays 27a–27b have just completed shifting out the last remaining charges collected during a previous sample exposure period. Note that, to prevent corruption of the data derived from such charges, the controller 110 preferably ensures that the transfer gate 44 of each array 27a–27c remains disabled while such charges are being shifted out of the register 47. This may be accomplished by transmitting a logical "low" control signal to the transfer gate 44 prior to point A, as shown by FIG. 7.

A detailed discussion of the timing diagram associated with photosensor array 27a will now be made with reference to FIGS. 6–8. As shown by blocks 112 and 115 of FIG. 8, once the initial data period expires (i.e., after point A), the controller 110 preferably enables the transfer gate 44 of the array 27a, provided that the amount of time ("$t_{data\ out}$") to the next data out period is greater than the duration ("$D_{sample}$") of the array's sample exposure period "a." In other words, referring to FIG. 7, the controller 110 preferably enables the transfer gate 44 of the array 27a provided that the time to point B is greater than duration of sample exposure period "a" of the array 27a.

In the example shown by FIG. 7, the time from point A to point B is indeed greater than the duration of the sample exposure period "a" of the array 27a, and the controller 110, therefore, enables the transfer gate 44 of the array 27a at point A. In the preferred embodiment, the transfer gate 44 is enabled by transitioning, to a logical "high," the control signal being transmitted to the transfer gate 44 by the controller 110.

While the transfer gate 44 remains enabled after point A, any charges produced by the photosensitive elements 41 are immediately transferred to the register 47, which continuously shifts the charges out of the register 47. Since the transfer gate 44 remains enabled during this shifting, charges from the photosensitive elements 41 enter register 47 as charges are being shifted by the register 47 thereby mixing, in the cells 49, charges from the elements 41 with charges being shifted by the register 47. The foregoing charges produced by the photosensitive elements 41 after point A and prior to sample period "a" are discarded after being shifted out of the register 47. Any known or future-developed technique for discarding charges may be employed. For example, the controller 110 may discard the electrical signals that are transmitted by the output amplifier 31 and that are based on the charges transferred to the register 47 between consecutive sample exposure periods. Alternatively, the controller 110 may control (e.g., reset) the output amplifier 31 of array 27a such that the amplifier 31 does not convert such charges to electrical signals. Keeping the transfer gate 44 enabled for a substantial portion of a time period between a data out period and the next sample exposure period helps to prevent saturation and charge corruption of when the next sample exposure period occurs.

Figure 8:
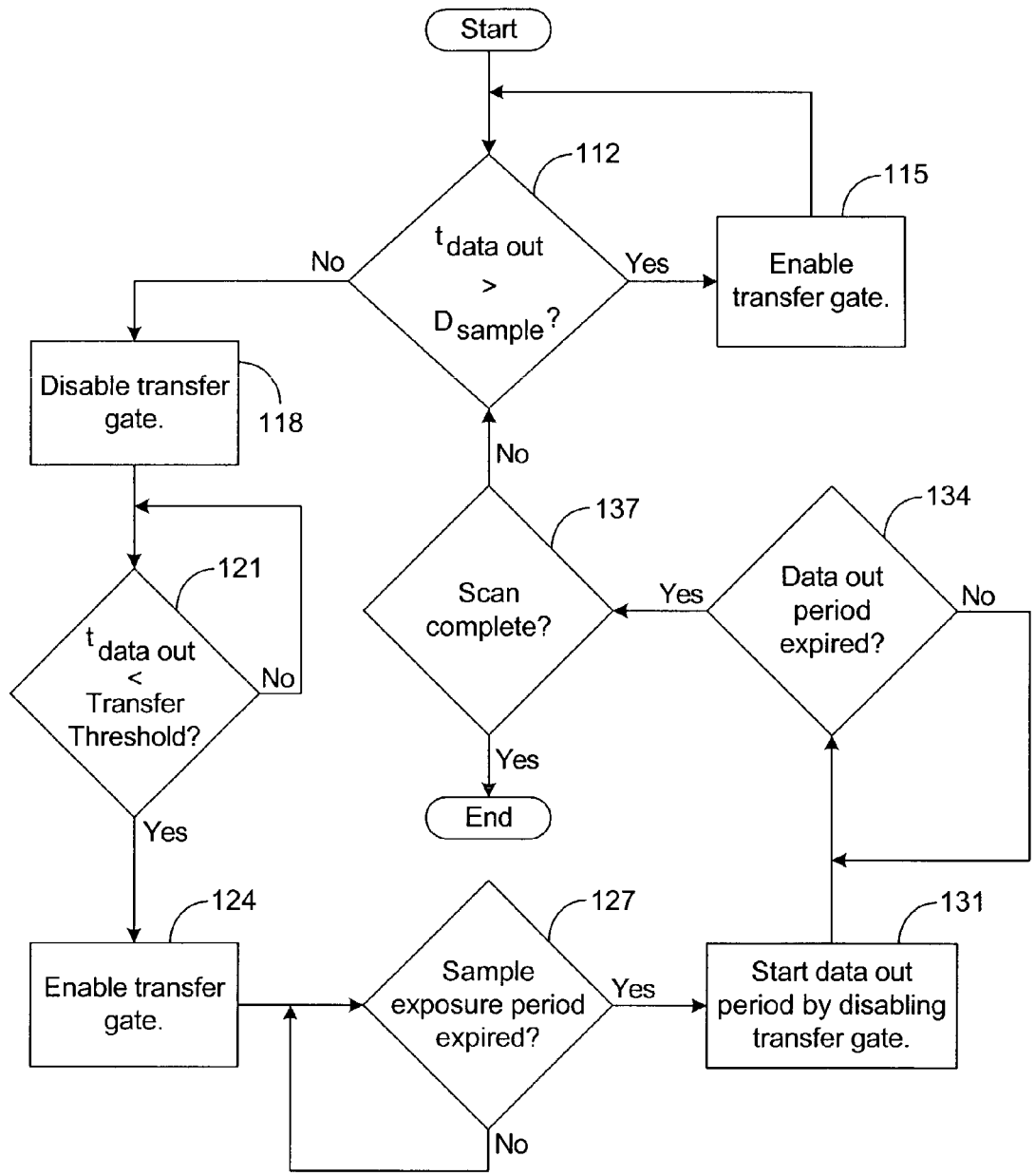
FIG. 8 is a flow chart illustrating an exemplary process for controlling a transfer gate of the photosensor array depicted in FIG. 6.

In FIG. 8, once a "no" determination is made in block 112, the controller 110, in block 118, disables the transfer gate 44 thereby beginning the sample exposure period "a." In the preferred embodiment, the transfer gate 44 is disabled by transitioning, to a logical "low," the control signal being transmitted to the transfer gate 44. During the sample exposure period "a," charges are collected in the photosensitive elements 41. At the end of the sample exposure period "a," the collected charges are transferred to the register 47 by briefly enabling the transfer gate 44, as shown by blocks 121 and 124 of FIG. 8. In this regard, when the amount of time to the data out period falls below a threshold, referred to as a "transfer threshold," the controller 110 enables the transfer gate 44, via block 124, until the sample exposure period "a" expires. The amount of time that the transfer gate 44 remains enabled is preferably sufficient for allowing all of the charge collected prior to the enabling of the gate in block 124 to transfer to the register 47. Note that the enabling of the gate 44 in block 124 is preferably accomplished by transitioning, to a logical "high," the control signal being transmitted to the transfer gate 44.

Once the sample exposure period "a" expires (i.e., at point B), the controller 110 disables the transfer gate 44 in order to prevent corruption of the charges now residing in the register 47, as shown by blocks 127 and 131 of FIG. 8. This disabling of the transfer gate 44 marks the beginning of a data out period, and the controller 110 preferably keeps the transfer gate 44 disabled during the remainder of the data out period, as shown by block 134 of FIG. 8. In the preferred embodiment, the foregoing is accomplished (1) by transitioning the transfer gate's control signal to a logical "low" at the expiration of the sample exposure period and (2) by keeping the transfers gate's control signal in a logical "low" state until expiration of the data out period.

During the data out period, the charges within the register 47 (i.e., the charges collected during the sample exposure period "a") are serially shifted out of the register 47 and converted into electrical signals via conventional techniques. These electrical signals are amplified by the output amplifier 31 and received by the controller 110, which retains and/or processes such signals as a sample of pixel color values. The controller 110 may further process the pixel color values, including rendering the pixel color values or providing the pixel color values to the host 21. Upon completion of the data out period, the transfer gate 44 may be enabled, and the process shown by FIG. 7 is preferably repeated for the next sample of pixel color values, if there is more surface to be scanned, as shown by block 137.

In the preferred embodiment, the controller 110 is configured to control the transfer gates 44 of the other photosensor arrays 27b and 27c according to the same techniques. However, due to the different lengths of sample exposure periods "b" and "c," as compared to sample exposure period "a," block 118 will be performed at different times for the different arrays 27a–27c. In this regard, the enabling of the transfer gates 44 (i.e., the transitioning of the transfer gates' control signals) for the arrays 27a–27c between points A and B preferably occur according to the timing diagram shown in FIG. 7.

Note that the lengths of any of the sample exposure periods "a," "b," or "c" can be shortened or lengthened as desired in other embodiments. Furthermore, a user of the system 100 may change the duration of any of the sample exposure periods "a," "b," or "c," as desired. In this regard, the system 100 may include a user interface 135 (FIG. 5), such as a keypad, for example, for enabling the user to provide the system 100 with inputs. The user may utilize the user interface 135 to request a particular sampling rate and/or to request a particular duration for the sample exposure period of one or more of the photosensor arrays 27a–27c.

After receiving a user request to change the sampling rate or a duration of a sample exposure period, the amount of time between occurrences of data out periods (and/or sample exposure periods) can be set according the desired sampling rate. In this regard, the data out periods and the sample exposure periods are preferably separated in time such that the frequency of the data out periods and the sample exposure periods corresponds to or matches the desired sampling rate. Moreover, based on the user's inputs, the controller 110 determines when (e.g., how far apart) the sample exposure periods and/or the data out periods are to occur. The controller 110 then preferably controls the transfer gates 44 of the arrays 27a–27c such that the transfer gate 44 of an array 27a–27c remains enabled except during the array's sample exposure periods and data out periods. Furthermore, the controller 110 preferably discards any values derived from charges collected during time periods outside of the sample exposure periods. Note that the algorithm shown by FIG. 8 may be employed by the controller 110 to achieve the foregoing results. However, it should be noted that other algorithms may be employed to implement the functionality of a preferred embodiment or other embodiments of the present invention.

Furthermore, it should also be noted that it is not necessary for the controller 110 to actually make the decisions shown in FIG. 8 during operation. In this regard, it is possible for a programmer or a technician to first determine how far apart the transitions of the control signals should be in order to achieve the results shown by FIG. 7 and then to program the controller 110 accordingly.

It is further possible to enable higher sampling rates (i.e., the number of sample exposure periods that occur over time) for a photosensor array 27a–27c by overlapping sample exposure periods and data out periods. For example, FIG. 9 depicts a timing diagram in which the sample exposure periods "a" and data out periods begin at the same time for photosensor array 27a, which has the longest sample exposure period.

Figure 9:
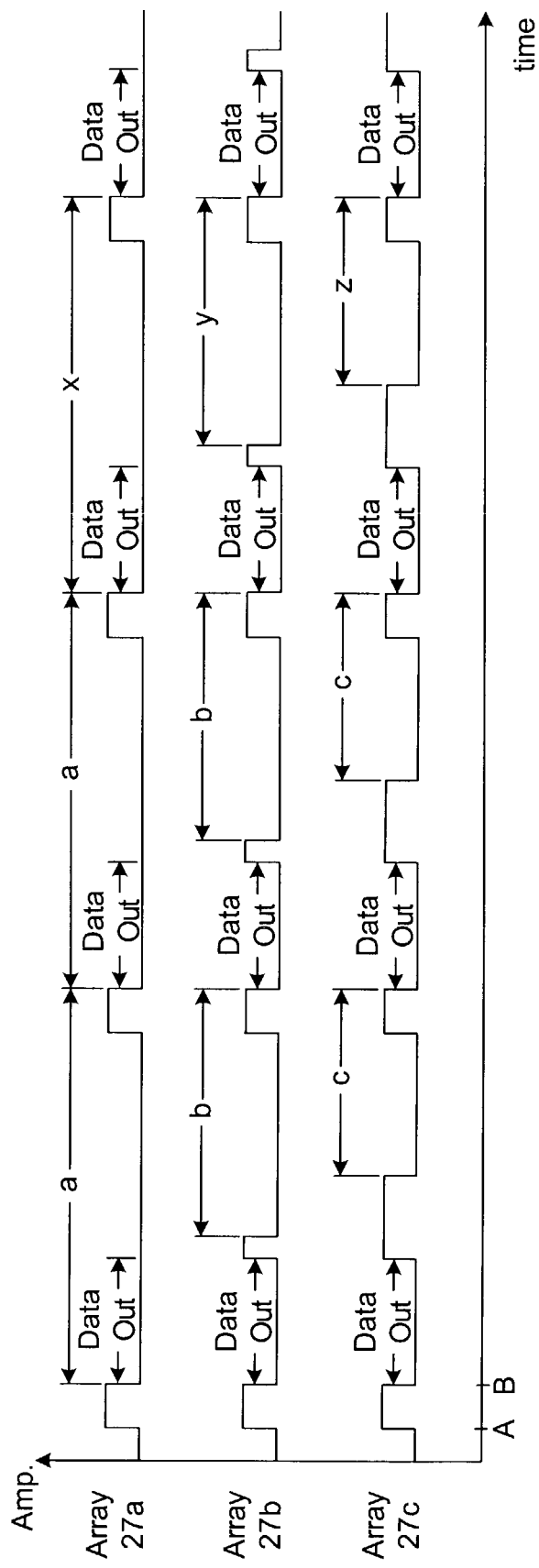
FIG. 9 is a timing diagram illustrating another embodiment for the control signals depicted in FIG. 7 in which sample exposure periods and data out periods overlap for one of the photosensor arrays controlled by the control signals.

Referring to FIG. 9, point B marks the end of an earlier sample exposure period for each of the arrays 27a–27c. According to the techniques described above, the controller 110 of the array 27a, at point A, briefly enables the array's transfer gate 44, in block 124, in order to transfer, to the register 47, the charges collected in the previous sample exposure period. Upon expiration of the previous exposure period, the controller 110 disables the transfer gate 44 in block 131, thereby beginning a data out period in which the aforementioned charges are shifted out of the register 47.

However, in the example shown by FIG. 9, point B marks not only the beginning of a data out period for the array 27a, but it also marks the beginning of the next sample exposure period "a." Therefore, block 115 is not performed for the array 27a. In other words, upon leaving block 137, a "no" determination is made in block 112, and block 118 is immediately implemented. As a result, the charges collected during the data out period form at least a part of the overall charges collected for the next sample exposure period "a." Therefore, unlike the example shown by FIG. 7, the charges collected during the data out periods for array 27a are not discarded by the controller 110 but are instead utilized to define the next sample.

Note that it is generally desirable for the lengths of the sample exposure periods "a," "b," and "c" to be sufficiently long to prevent corruption of the charges being shifted by the register 47 during the data out periods. In this regard, if a sample exposure period for one of the arrays 27a–27c is shorter than the array's data out period, then, depending on the timing and lengths of data out periods and sample exposure periods, charges from a current sample exposure period may be transferred into the register 47 as charges from the previous sample exposure period are being shifted out of the register 47, thereby undesirably mixing charges from the two exposure periods. This may be prevented by ensuring that the sample exposure period is sufficiently long such that the enabling of the transfer gate 44 for transferring the charges of a current sample exposure period does not occur until the data out period for shifting the charges of the previous sample exposure period has expired. However, other techniques for preventing corruption of charges from sample exposure periods are also possible in other embodiments.

Figure 10:
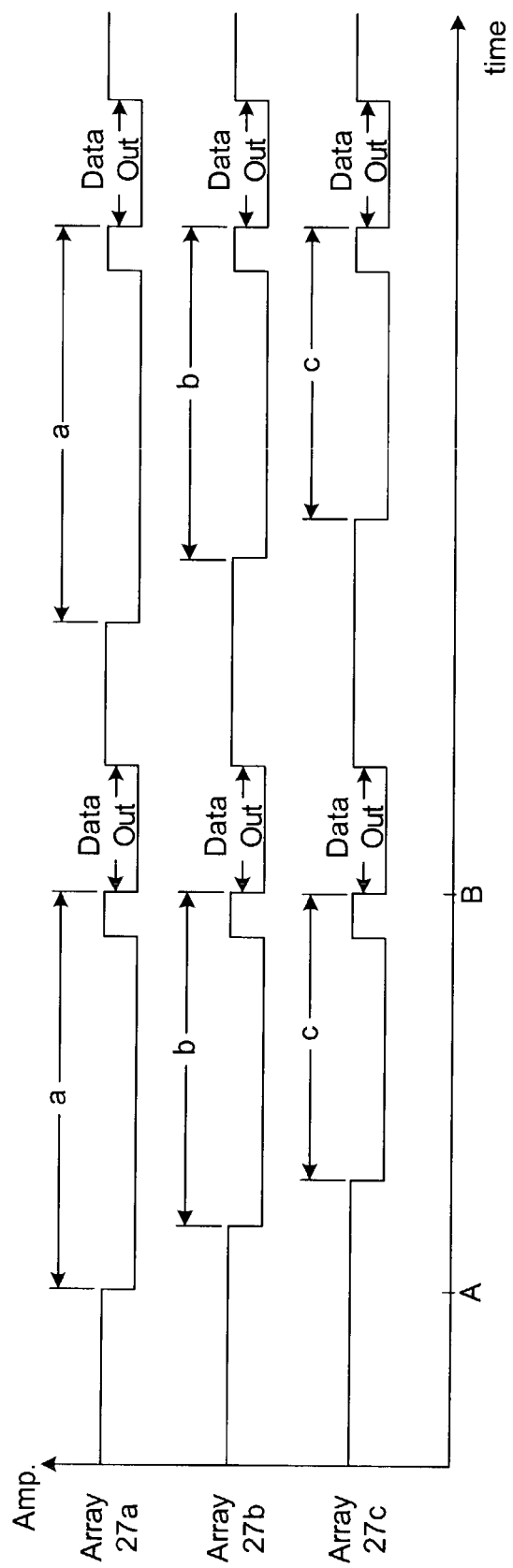
FIG. 10 is a timing diagram illustrating another embodiment for the control signals depicted in FIG. 7 for a situation when the scanner depicted in FIG. 5 is being moved to a location where scanning is to commence.

FIG. 10 depicts a timing diagram for the photosensor arrays 27a–27c when the scanner 105 is being moved to a location, referred to herein as "the commencement location," where scanning is to commence. In this regard, assume that the scanner 105 arrives at the commencement location at point A in the diagram shown by FIG. 10. As shown by FIG. 10 and by blocks 145 and 151 of FIG. 11, the transfer gates 44 of the arrays 27a–27c are preferably enabled prior to the scanner 105 arriving at the commencement location. Thus, any charges produced by the photosensitive elements 41 prior to point A are preferably transferred to the register 47, which continuously shifts such charges out of the register 47. Each set of such charges shifted out of the register 47 is preferably discarded by the controller 110.

Figure 11:
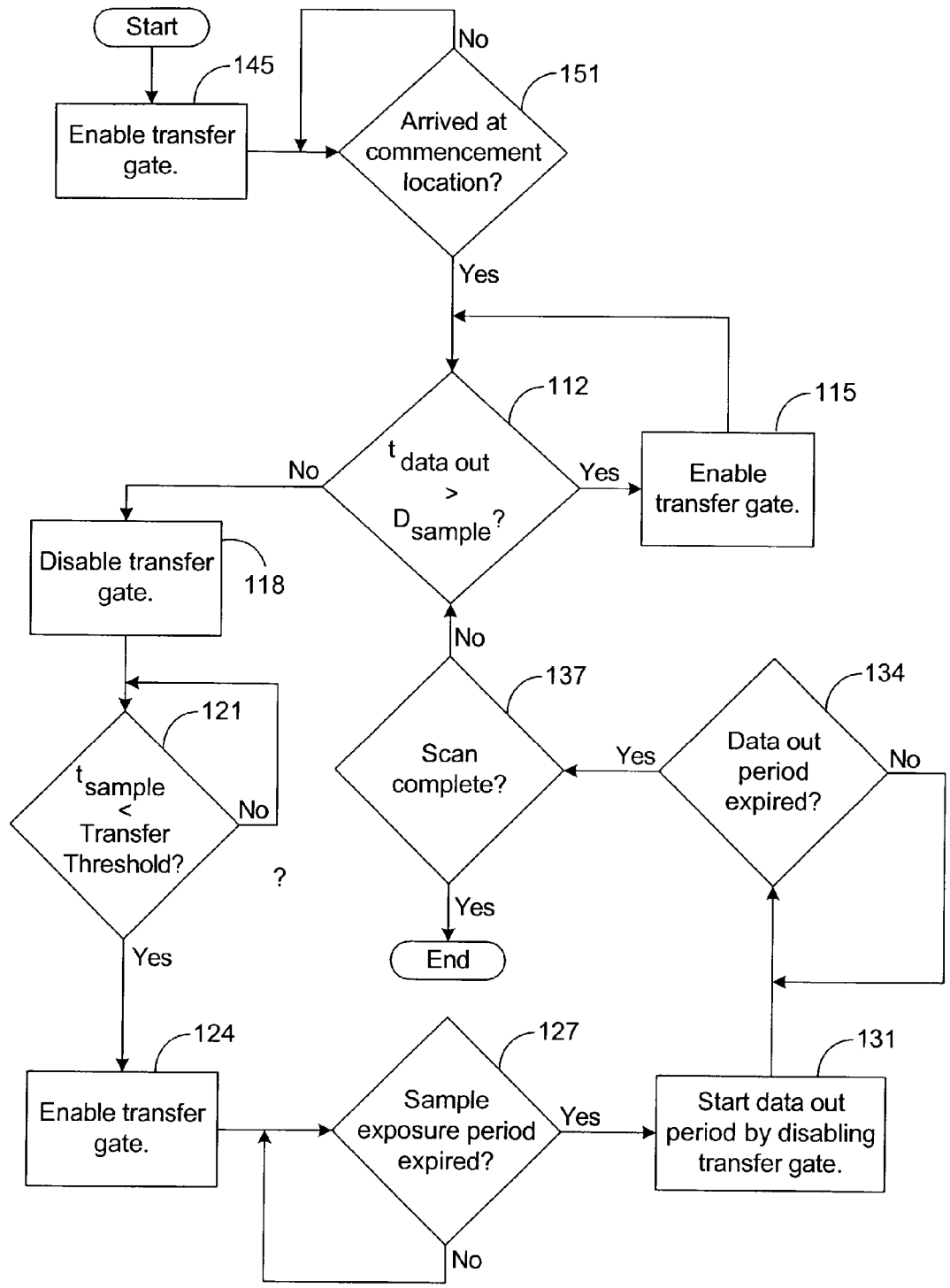
FIG. 11 is a flow chart illustrating an exemplary process for controlling a transfer gate of the photosensor array depicted in FIG. 6 for a situation when the scanner depicted in FIG. 5 is being moved to a location where scanning is to commence.

Upon arriving at the commencement location (i.e., at point A in FIG. 10), the controller 10 begins to control the transfer gates 44 according to the same process shown by FIG. 8, as can be seen by comparing FIG. 11 to FIG. 8. Thus, after arriving at the commencement location and beginning a sample exposure period, the controller 110 begins performing according to the same techniques described above for the preferred embodiment.

Note that there is no need for the scanner 105 to pause upon arriving at the commencement location. In this regard, since the transfer gates 44 remain enabled prior to the scanner 105 arriving at the commencement location, there are no additional charges residing in the photosensitive elements 41 when the scanner 105 arrives at the commencement location. Thus, any charges collected after arriving at the commencement location (i.e., after point A of FIG. 10) are indicative of the object portion that is to be scanned.

Furthermore, if a data out period occurs before the charges collected prior to point A have shifted out of the register 47, then data corruption may occur. Thus, it may be desirable to control the timing or phase of the exposure periods and data out periods such that point A (i.e., the time that the scanner 105 arrives at the commencement location) and each subsequent data out period is separated by at least a sufficient amount of time for all of the charges residing in the register 47 at point A to shift out of the register 47.

By implementing the techniques described above for the various embodiments of the present invention, it is possible to realize various benefits, including benefits similar to the ones enabled by the shutter 52 of FIG. 4. In particular, the sample exposure periods can be adjusted to any desired length and can be initiated at any desirable time. Therefore, more suitable sample exposure periods can be achieved, and a scanner 105 in accordance with the preferred embodiment of the present invention can begin to scan "on the fly."

The invention claimed is:

1. A photosensitive system, comprising:
    an array of photosensitive elements;
    a charge transfer register having a at least a first cell and a second cell;
    a transfer gate coupled to the photosensitive elements and the charge transfer register; and
    a controller configured to enable the transfer gate between successive sample exposure periods and to disable the transfer gate during the sample exposure periods, the controller further configured to control a duration of a time period that the transfer gate remains continuously enabled between the successive sample exposure periods based on a desired duration for one of the sample exposure periods, wherein charges from at least one of the photosensitive elements are shifted by the charge transfer register from the first cell to the second cell causing charges transferred into the second cell from another of the photosensitive elements to be mixed in the second cell with the charges from the at least one photosensitive element while the transfer gate is enabled between the successive sample exposure periods.

2. The system of claim 1, wherein the controller is configured to define pixel color values based on charges collected by the photosensitive elements and transferred to the charge transfer register during the sample exposure periods, and wherein the controller is further configured to discard values based on charges transferred from the photosensitive elements to the charge transfer register between the successive exposure periods.

3. The system of claim 1, wherein an end of the time period coincides with a beginning of one of the sample exposure periods.

4. The system of claim 1, wherein the controller is configured to enable the transfer gate until the photosensitive system arrives at a location that is to be scanned via the photosensitive system, the controller further configured to discard values based on charges transferred from the photosensitive elements to the charge transfer register prior to the system arriving at the location.

5. A photosensitive system, comprising:
an array of photosensitive elements;
a transfer gate coupled to the photosensitive elements;
a charge transfer register having a plurality of cells coupled to the transfer gate, each of the cells configured to receive charges from a respective one of the photosensitive elements via the transfer gate, the charge transfer register configured to shift the charges out of the charge transfer register; and
a controller configured to control the transfer gate such that charges are collected in each of the photosensitive elements and transferred, via the transfer gate, to the charge transfer register, the controller further configured to enable the transfer gate during a time period when the charge transfer register is shifting a set of charges previously transferred from the array of photosensitive elements to the charge transfer register such that charges from one of the photosensitive elements are transferred into a particular cell of the charge transfer register via the transfer gate as charges from at least one other of the photosensitive elements are shifted by the charge transfer register into the particular cell.

6. The system of claim 5, wherein the controller is configured to define pixel color values based on charges collected by the photosensitive elements and transferred to the charge transfer register during sample exposure periods, wherein the time period is between consecutive sample exposure periods, and wherein the controller is further configured to discard values based on the set of charges shifted by the charge transfer register during the time period.

7. The system of claim 5, wherein the controller is configured to enable the transfer gate until the photosensitive system arrives at a location that is to be scanned via the photosensitive system, wherein the time period is prior to the system arriving at the location, and wherein the controller is further configured to discard values based on the set of charges shifted by the charge transfer register during the time period.

8. The system of claim 5, wherein the controller is configured to enable the transfer gate for an entire duration of the time period, and wherein the charge transfer register performs multiple shifts of the set of charges during the time period.

9. A photosensitive system, comprising:
means for sensing light intensity and for producing first, second, and third sets of charges based on the light intensity sensed by the sensing means;
means for receiving and shifting charges, the receiving and shifting means having at least a first cell and a second cell;
means for transferring the first, second, and third sets of charges from the sensing and producing means to the receiving and shifting means, wherein the first and second sets of charges transfer from the transferring means directly to the first cell and wherein the third set of charges transfers from the transferring means directly to the second cell; and
means for controlling the transferring means such that charges are prevented from transferring from the sensing and producing means to the receiving and shifting means while the first set of charges is being shifted by the receivihg and shifting means and such that the third set of charges is enabled to transfer from the sensing and producing means to the receiving and shifting means while the second set of charges is being shifted by the receiving and shifting means thereby mixing the second set of charges with the third set of charges in the second cell.

10. The system of claim 9, wherein the controlling means is configured to define a sample of pixel color values based on the first set of charges and to discard values based on the second set of charges.

11. A method for controlling charge transfers for photosensitive arrays, comprising:
collecting charges within an array of photosensitive elements and transferring the charges, via a transfer gate, to a charge transfer register during sample exposure periods;
enabling the transfer gate between successive sample exposure periods;
controlling a duration of a time period that the transfer gate remains continuously enabled via the enabling based on a desired duration for one of the sample exposure periods; and
shifting charges through the charge transfer register while the transfer gate remains continuously enabled via the enabling such that charges transferred from one of the photosensitive elements mixes with charges transferred from another of the photosensitive elements.

12. The method of claim 11, further comprising:
defining pixel color values based on charges collected via the photosensitive elements during the sample exposure periods; and
discarding values based on the mixed charges.

13. The method of claim 11, further comprising:
moving the photosensitive elements to a location to be scanned by the photosensitive elements;
enabling the transfer gate during the moving until the photosensitive elements arrive at the location; and
discarding values based on charges transferred from the photosensitive elements to the charge transfer register during the moving.

14. The method of claim 11, wherein an end of the time period coincides with a beginning of one of the sample exposure periods.

15. A method for controlling charge transfers for photosensitive arrays, comprising:
collecting a first set of charges within an array of photosensitive elements and transferring the first set of charges to a charge transfer register;

transferring a second set of charges from the photosensitive elements to the charge transfer register;
shifting the first set of charges out of the charge transfer register;
shifting the second set of charges out of the charge transfer register;
preventing charges collected in the photosensitive elements from transferring to the charge transfer register while the first set of charges remains in the charge transfer register; and
transferring a third set of charges from the photosensitive elements into a particular cell of the charge transfer register as the second set of charges are shifted by the charge transfer register into the particular cell thereby mixing the second set of charges with the third set of charges in the particular cell.

16. The method of claim 15, further comprising:
defining a sample of pixel color values based on the first set of charges; and
discarding values based on the second set of charges.

17. The method of claim 15, further comprising:
moving the photosensitive elements to a location to be scanned by the photosensitive elements; and
discarding values based on charges transferred from the photosensitive elements to the charge transfer register prior to an arrival of the photosensitive elements at the location to be scanned by the photosensitive elements,
wherein the transferring charges from the one photosensitive element is continuously performed until the photosensitive elements arrive at the location to be scanned by the photosensitive elements.

18. A photosensitive system, comprising:
an array of photosensitive elements;
a charge transfer register having a plurality of cells, each of the cells coupled to a respective one of the photosensitive elements, the charge transfer register configured to shift charges received from the photosensitive elements through the cells such that charges in each of the cells are respectively shifted into an adjacent one of the cells until arriving at an end cell of the charge transfer register, wherein charges in the end cell are shifted out of the charge transfer register;
a transfer gate coupled to the photosensitive elements and to the charge transfer register, wherein the transfer gate, when enabled, allows charges in each of the photosensitive elements to transfer to a respective one of the cells of the charge transfer register and, when disabled, prevents charges in the photosensitive elements from transferring to the cells of the charge transfer register; and
a controller configured to control the transfer gate, the controller further configured to enable the transfer gate when the charge transfer register is shifting, through the cells, a set of charges previously transferred from the array of photosensitive elements to the charge transfer register.

19. The system of claim 18, wherein the controller is further configured to discard the set of charges.

20. The system of claim 18, wherein the controller is configured to enable the transfer gate between successive sample exposure periods and to disable the transfer gate during the sample exposure periods, the controller further configured to control a duration of a time period that the transfer gate remains continuously enabled between the successive sample exposure periods based on a desired duration for one of the sample exposure periods.

21. The system of claim 20, wherein the charge transfer register continuously shifts charges through the cells for the duration of the time period.

* * * * *

UNITED STATES PATENT AND TRADEMARK OFFICE
CERTIFICATE OF CORRECTION

| | |
|---|---|
| PATENT NO. | : 7,071,983 B2 |
| APPLICATION NO. | : 10/177081 |
| DATED | : July 4, 2006 |
| INVENTOR(S) | : Kurt Eugene Spears |

Page 1 of 1

It is certified that error appears in the above-identified patent and that said Letters Patent is hereby corrected as shown below:

In column 12, line 14, delete "10" and insert -- 110 --, therefor.

In column 14, line 19, in Claim 9, delete "receivihg" and insert -- receiving --, therefor.

Signed and Sealed this

Fifth Day of May, 2009

JOHN DOLL
*Acting Director of the United States Patent and Trademark Office*